Dec. 31, 1946.  C. G. DUNN ET AL  2,413,300

POSITION TRACKING, TRANSMITTING, AND RECORDING

Filed May 5, 1943  6 Sheets—Sheet 1

INVENTORS
C. G. Dunn
BY W. J. Tellington

ATTORNEY

Dec. 31, 1946. C. G. DUNN ET AL 2,413,300
POSITION TRACKING, TRANSMITTING, AND RECORDING
Filed May 5, 1943  6 Sheets-Sheet 2

INVENTORS
C. G. Dunn
W. J. Tellington
BY
ATTORNEY

Dec. 31, 1946.  C. G. DUNN ET AL  2,413,300
POSITION TRACKING, TRANSMITTING, AND RECORDING
Filed May 5, 1943.  6 Sheets-Sheet 4

INVENTORS
C. G. Dunn
W. J. Tellington
BY
ATTORNEY

Dec. 31, 1946.  C. G. DUNN ET AL  2,413,300
POSITION TRACKING, TRANSMITTING, AND RECORDING
Filed May 5, 1943  6 Sheets-Sheet 6

INVENTOR.
C. G. Dunn and W. J. Pellington
BY
Hobart N. Durham
ATTORNEY

Patented Dec. 31, 1946

2,413,300

UNITED STATES PATENT OFFICE 2,413,300

POSITION TRACKING, TRANSMITTING, AND RECORDING

Charles G. Dunn, Fort Leavenworth, Kans., and Wentworth J. Tellington, West Point, N. Y.

Application May 5, 1943, Serial No. 485,700

5 Claims. (Cl. 177—352)

The invention relates to new and useful means for automatically allocating positions of vehicles on terrain with respect to an oriented map and instantaneously and continuously transmitting coordinate positions thereof to a receiving or recording map station where said positions are automatically rendered visible to observers.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The invention is directed to providing novel and useful means for transmitting to a receiving observer, in accurate form, visual information of the location of objects such as vehicles, personnel and other items of military interest; to do so instantaneously and secretly; and to make such permanent records of the transmitted information as may be desired. More concretely stated, the invention provides automatic means whereby the position of any moving vehicle (tank, scout car, airplane, etc.) is automatically and continuously determined with respect to the terrain over which it is passing and such determinations instantaneously, continuously and accurately transmitted to one or more oriented receiving maps at headquarter stations. Thus, the positions and movements of every friendly vehicle in a given zone or sector can be shown at all times on a centrally located situation map.

Using the same equipment the operator in any vehicle in the field can also instantly throw onto the receiving map at headquarters the position and identity of any observed matter of military interest. Thus an operator in an observation plane or other vehicle or station can cause to appear on the map at headquarters the presence, position and identity of an enemy battery, body of troops or any other static or moving thing seen by the observer in the plane.

Coordinated with the same basic transmitting equipment the invention provides, for each vehicle using the same, a self-oriented record track of its position and course on a map or other reference means carried by the vehicle, thus enabling the driver always to know where he is and where he has been. This feature of the invention is simple, rugged, foolproof and in itself possesses novel and superior features.

The invention also contemplates provision of equipment utilizing principles heretofore mentioned whereby a course previously followed or laid out over unmapped terrain can be used as an automatic guide for vehicles retracing that course. Thus vehicles can be directed over and held to predetermined courses regardless of conditions of visibility or knowledge of the course to be followed.

The invention permits the use of exceedingly simple and proven mechanical and radio equipment and very simple and elementary forms of radio transmission may be used. Nevertheless, ranges of reception and transmission are of substantial extent while interception and interpretation of the transmitted data are difficult so that danger of locating the transmitting vehicle or station and interpretation of the transmitted data are relatively slight.

Broadly described, the basic coordinate-determining and transmitting mechanism comprises a simple mechanical plotting and mapping machine and a special radio transmitter automatically coupled with the travel movements of the vehicle. These devices are preferably combined in one convenient unit mounted in the body of a scout car, airplane or other vehicle. The plotting and mapping machine, working from the polar coordinates of the vehicle's speed and direction, resolves them into north-south and east-west coordinates, said coordinates being applied in the form of mechanical motion to mark continuously and automatically on a mapping board the course of the vehicle over the terrain on which it is located and which is shown on the map. Said N-S and E-W coordinates are also transformed from mechanical motions into terms of varying radio frequencies and said frequencies transmitted to a distant receiver or receivers. The radio receiver re-converts the received frequencies into mechanical motions which are applied to record the course of the vehicle on an individual mapping board. The received and converted N-S and E-W coordinate motions are also utilized to operate a light projector which throws onto a relatively large "situation" map screen a beam of light symbolizing the position of the transmitting vehicle. As the position of that vehicle changes, the projector moves to throw its vehicle symbol to the changed positions on the map, thus continuously and instantaneously presenting to the observer the map position of said vehicle at all times. By providing all vehicles (or selected vehicles) with such transmitters, a plurality of receiving projectors can illustrate on the same situation map at the same time the positions of all said vehicles and thereby immediate vital information as to the occurrences and flow of battle or other situations can be observed and understood.

The same basic mechanism can also be utilized to transmit the coordinates of items remote from vehicles having such equipment but which come within their range of observation or information. For example, an observation plane or reconnaissance car can cause to appear on the situation map at headquarters the presence, position and identity of any observed matter of military interest such as an enemy battery, body of troops or the like. This is done by transmitting through the same radio transmitting means the observed position of the item in the form of its N-S and E-W coordinates, as same are seen or are understood to be from the position of the transmitting vehicle. Other observing vehicles may simultaneously transmit the same information and thereby provide intersecting data which will enable the observer at headquarters to obtain an accurate idea of the position and movement of such observed items.

Figure 5:
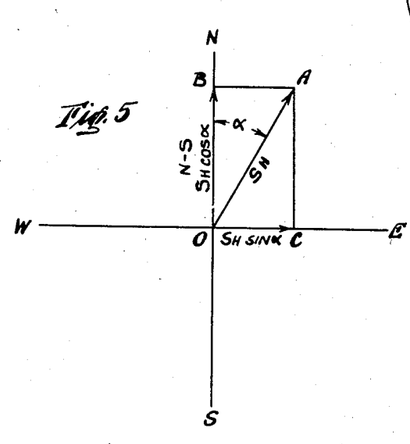
Fig. 5 is a vector diagram showing the resolution of the polar coordinates of travel.

It will be understood from the foregoing general description and the following detail description as well are exemplary and explanatory but are not restrictive of the invention. Referring now in detail to present preferred embodiments of the invention, same are illustrated in the accompanying drawings. The primary step of the invention depends upon the resolution of polar coordinates of vehicle position and travel into N-S and E-W coordinates, i. e., rectangular or Cartesian coordinates applicable to properly oriented maps of the terrain under observation. Said polar coordinates are (1) the true horizontal speed of the vehicle and (2) the true azimuth of the vehicle's direction. Given these polar coordinate elements (which in practice are obtained directly from the vehicle through its speed of travel and true-direction-determining means, such as a gyro compass) the mathematical process whereby same are resolved into N-S and E-W coordinates is illustrated in Fig. 5. As shown, OA=horizontal speed of the vehicle,
$\alpha$=the azimuth of its direction
BA (OC) represents its E-W coordinate
CA (OB) represents its N-S coordinate Then:

(a) $BA = OA \sin \alpha$
(b) $CA = OA \cos \alpha = OA \sin (90° - \alpha)$

Figure 1:
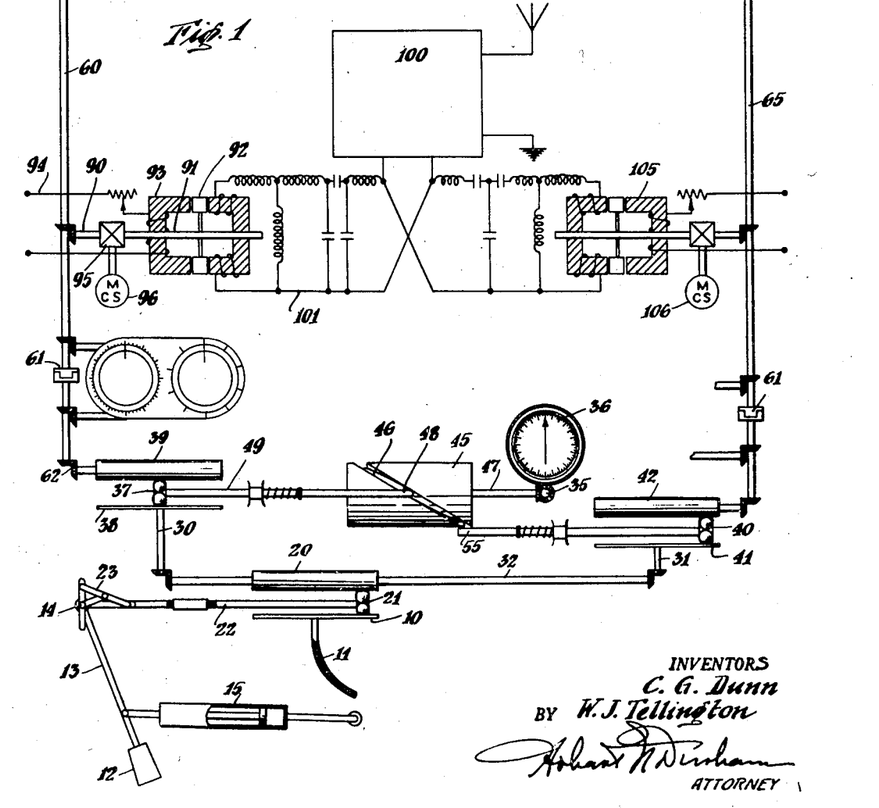
Fig. 1 is a schematic diagram of apparatus embodying the invention, showing the basic coordinate-determining mechanism and radio transmission means therefor.
Figure 3:
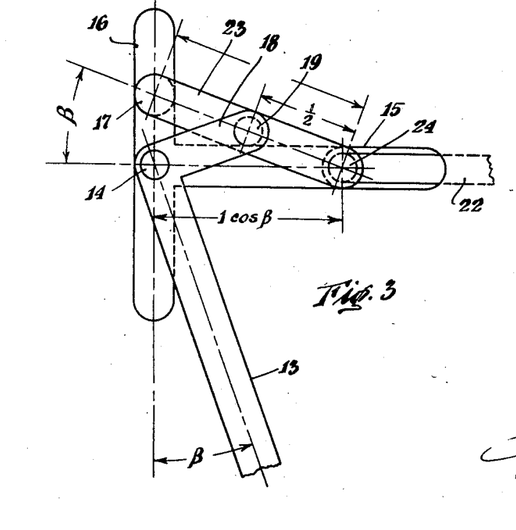
Fig. 3 is an enlarged fragmentary detail of the cosine solving mechanism shown in Fig. 1.

Means for obtaining the true horizontal speed of the vehicle is shown in Fig. 1, where the disc 10 of a ball and disc drive is rotated by the speedometer cable 11 of a vehicle (not shown) in which the apparatus of Fig. 1 is carried. Thus disc 10 rotates at a speed proportional to the actual or "slope" speed of a vehicle traveling over the ground, whether same be level or inclined. A pendulum or plumb bob 12 is freely pivotally supported from the vehicle by means of a shaft 13 pivoted about fixed pin 14. Thus the shaft 13 and bob 12 function as a plumb line constantly establishing an angle equal to the fore-and-aft slope of the vehicle with respect to true horizontal. Erratic movements of the shaft and bob are prevented by means of a damper or shock absorber comprising the cylinder and piston construction 15. Disc 10 frictionally drives horizontal speed cylinder 20 through a standard dual ball drive 21. The radial position of the ball carriage 21 with respect to the disc 10 determines what proportion of the speed of the disc is transmitted to the cylinder 20 in accordance with the known law of operation of such ball and disc drives. In accordance with this feature of the invention the radial positions of the ball carriage 21 are varied in accordance with the slope angle of the vehicle so that the cylinder 20 will always rotate proportionately to the true horizontal speed of the vehicle. Accordingly, ball carriage 21 is mounted on horizontally disposed arm 22 which is moved in and out distances varying with the cosine of the angle of slope. This factor is introduced by means of the cosine-solving mechanism 23, the detailed construction and operation of which are shown in Fig. 3 and described in detail below.

Figure 4:
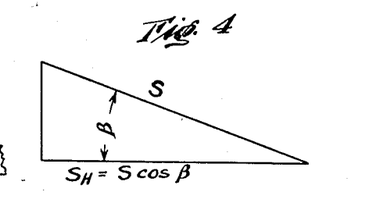
Fig. 4 is a diagrammatic showing of the geometric solution of the horizontal component of speed or travel mechanically performed by the mechanism of Fig. 3.

As shown, the pin 14 on which arm 13 is pivotally mounted also supports a T-shaped member having the stem portion 15 and the head portion 16. The inclined bar 23 is pivotally connected through pin 17 to a vertical slot in member 16 so that said pin 17 is constrained to slide in said slot. At its other end bar 23 is similarly constrained by pin 24 to slide horizontally in a slot in the stem portion 15 of the T member. The weighted bar 13 is provided with an L-shaped extension 18 pivotally connected by pin 19 to the center point of bar 23. Thus, as the arm 13 swings through angle β due to the slope of the vehicle, the inclined bar 23 always takes up that same angle β with respect to the right-angled legs 15 and 16 of the T member. Consequently, the quantity cos β is represented by the distances 14—24. The horizontal arm 22 is also pivotally connected to pin 24 and is constrained to slide parallel with the stem member 15 by being sleeved therewithin. Thus the relationship illustrated by the triangle in Fig. 4 is mechanically maintained and solved by the mechanism shown in Fig. 3.

The true horizontal vehicle speed, represented as the rotation of cylinder 20, is transmitted equally to two vertical shafts 30 and 31, respectively, by beveled gears at the ends of the cylinder shaft 32, thereby to provide the polar coordinate of true horizontal speed for the resolution of each of the N–S and E–W coordinates, respectively.

The preferred means for providing the other element of the polar coordinates (the azimuth of the vehicle direction, i. e. angle α) includes shaft 35 which is turned proportionately to said angle α. The measurement of said angle may be and preferably is obtained from a gyro-compass diagrammatically indicated at 36, said compass having means for transmitting suitable mechanical motion to the shaft 35 in known manner. Such means may be similar, for example, to those used in the directional gyro controls of an automatic pilot, type A-2, as shown and described, for example, in War Department Technical Manual on Aircraft Instruments, TM 1–413, dated February 2, 1942, pp. 150–161, used if desired in combination with a directional gyro indicator of the type shown in said training manual, pp. 132–139.

Such directional indication and turning of the shaft 35 may also be obtained instead from means operatively coupled to the steering mechanism of the vehicle such as illustrated for example in U. S. Patent 1,718,689 to Grafström, dated June 25, 1929. In said patent a lever is actuated by the steering mechanism, which lever positions the ball carriage of a ball and disc drive proportionate to the amount of turning. The disc of this drive rotates proportionate to speed of the vehicle. The output rotates an amount equal to the product of the speed and angle of turning, the resultant rotation always indicating the present direction of the vehicle. As will be obvious, the patented device can be applied in similar manner to rotate the shaft 35.

In accordance with the invention the E–W coordinate of the vehicle motion is obtained by multiplying the horizontal vehicle speed (that of shaft 30) by the sine of angle α, while the N–S coordinate is similarly obtained by multiplication of said horizontal speed (shaft 31) by the cosine of said angle. This multiplying action is effected for each of said two coordinates by ball and disc drives, wherein the product of the horizontal speed times sin α are obtained through radial displacement of the ball carriage 37 over the face of the horizontal speed disc 38, said displacement varying with the sine of angle α. The ball carriage 37 drives a frictionally contacting horizontal cylinder 39, the rotation of which is therefore proportional to the E–W coordinate of the vehicle's motion.

Similarly, the ball carriage is displaced radially across the face of horizontal speed disc 41 in proportion to the cosine of α, thereby drive horizontal cylinder 42 proportionately to the N–S coordinate of vehicle speed.

The displacements of the ball carriages 37 and 40 in accordance with the sine and cosine of α, respectively, are effected by means of a 360° sine cam comprising the cylinder 45 having suitable sine cam groove 46 along the cylinder surface thereof. Said cylinder is rotated in accordance with the angle α by means of cylinder shaft 47 which is driven from the directional shaft 35. The cam follower 48 is adjustably and resiliently connected to the arm 49 of ball carriage 37 and is so adjusted on the cam with respect to disc 38 that it will occupy the center thereof, as shown, when the azimuth of the vehicle direction is 0° and when it is 180°. Thus in the position shown, the azimuth of the vehicle direction is zero, i. e. true north, the ball carriage 37 is at the center of disc 38 and hence no motion is transmitted to cylinder 39, there being no E–W direction. In similar manner cam follower 55 is connected to ball carriage 40, the follower being mounted in the cam groove displaced 90° from the follower 48. Hence the movement of follower 55 will correspond to the cosine of α and in the position shown it is at the perimeter of the disc and thus transmits the maximum value of unity to the drive of cylinder 42 from disc 31. It will have the same radial displacement in the opposite direction at 270°.

The equation for the ball and disc drive 37—39 is:

(c) $$S_c = \frac{S_d \times D}{K}$$

where $S_c$ = Speed of cylinder
$S_d$ = Speed of disc
$K$ = A constant
$D$ = Distance of ball carriage from center of disc Substituting in Equation c $S_d$ = OA = Speed of vehicle
$D$ = Sin α = Sin of azimuth Hence speed of cylinder = E–W coordinate.
From Equation b above:

$$CA = OA \sin(90° - \alpha)$$

Thus the speed of cylinder 42 in ball and disc drive 40—41 equals the N–S coordinate.

A shaft 60 for transmitting the E–W coordinate motion of cylinder 39 is drivingly connected through clutch 61, shaft 62 and beveled gears 63 to the shaft of said cylinder 39. Similarly shaft 65 transmits the N–S coordinate motion by similar connections to the shaft of cylinder 42.

Figure 2:
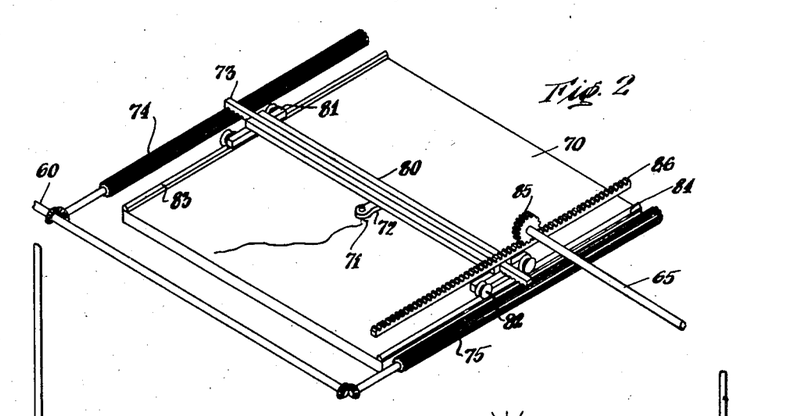
Fig. 2 is a perspective view of a course plotting mechanism operative in conjunction with the apparatus of Fig. 1.

In accordance with the invention means are provided for continuously recording on a map the motion of the vehicle as derived from the coordinate motions of the shafts 60 and 65 and such means are shown in Fig. 2. As there shown a map board 70 is provided for carrying a map or sheet upon which the positions of the moving vehicle may be inscribed by a stylus 71. Said stylus is adapted to be moved in the E–W direction by motion transmitted from shaft 60 and in the N–S by motion transmitted from shaft 65. For this purpose the stylus is mounted on a traveling arm 72 which is attached to and projects from a horizontal rack bar 73 which is adapted for translation in the E–W direction. Such translatory motion is imparted to the rack by means of spur gears 74 and 75 at either end of the map board, said gears being driven directly from shafts 60 as will be clear from the drawings. Hence any rotation of shaft 60 will cause translation of said rack and thereby move the stylus 72 in corresponding in the E-W direction across the map.

Means for imparting motion to the stylus in the N-S direction on the map from the N-S coordinate shaft 65 comprises a grooved slide 80 in which the rack 73 is slidable. Said slide is mounted on trucks 81 and 82 at its ends, said trucks riding on trackways 83 and 84, respectively. Motion in the N-S direction is imparted to the slide 80 by means of a pinion gear 85 at the end of shaft 65 meshing with rack 80.

Means are provided for continuously transmitting both the coordinates by radio in terms of audio frequency to a receiver at the vehicle's base or headquarters. That is, the motion corresponding to the E-W coordinate is converted into an audio frequency proportional to said motion and the resulting frequency transmitted by suitable carrier wave to a receiving set. Thus variations in the transmitted frequency will be received as variations in the E-W coordinate and similarly as to the N-S coordinate and the receiving recorder thereby will be accurately and continuously informed as to the exact coordinate positions of the vehicle as so transmitted.

One form of means for converting the coordinates into frequencies and transmission of same by radio is shown in Fig. 1 wherein motion of the E-W coordinate shaft 60 is transmitted to a shaft 90 which transmits its motion to a shaft 91 supporting the rotary armature 92 of an inductor motor. The field coil 93 of said motor is suitably energized by a D. C. circuit 94.

Preferably the range of audio frequency assigned to the E-W coordinate will be within a definite band markedly different from that for the N-S coordinate. Accordingly, means are provided for adding a constant basic speed to the variable coordinate speed introduced by shaft 90 so that shaft 91 of the inductor motor will rotate at a speed which is that of shaft 90 plus the added basic speed. For this purpose the shafts 90 and 91 are connected through a differential 95 into the gearing of which is also connected a constant speed motor 96 so that the speed of said motor is added to that of the shaft 90 and shaft 91 therefore rotates at a speed representing the sum of the speed of shafts 90 and constant speed motor. The aggregate speed so imparted to the armature 92 is, by means of the inductor motor, used to generate an equivalent frequency which is then broadcast by means of the transmitter 100. Said transmitter may be of any suitable type and design, a preferred form being that known as U. S. Army Signal Corps radio transmitter (series 193). A suitable circuit 101 may be provided for modulating the frequency between the inductor motor and the transmitter.

In similar manner the N-S coordinate from shaft 65 is converted to audio frequency through inductor motor 105 and additive constant speed motor 106 and, by means of the same transmitter 100, broadcast concurrently with the E-W coordinate, it being understood that the frequency product of the inductor motor 105 is in a different frequency range so that the two coordinates are in quite different frequency bands. Since the frequency ranges required for the coordinates are not great, a channel may be left open for the transmission of messages by continuous short-wave telegraph or telephone.

In a modified form of the invention, preferred for simplicity as well as accuracy of transmission of coordinates by radio, means are provided for transmitting the N-S and E-W coordinates directly in terms of distances from any pre-selected arbitrary base line—i. e. ordinate or abscissa. One great advantage of this modification is that the frequencies received are in terms of absolute coordinate values so that it is not necessary for the receiver to remain constantly tuned to the transmitting station in order to avoid the possibility of confusion due to a failure constantly to receive the frequencies or to know their relation to and the actual oriented positions on the map.

Figure 6:
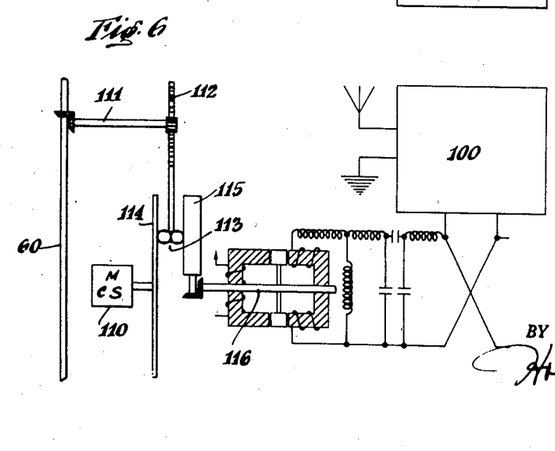
Fig. 6 is a view similar to a part of Fig. 1, showing a modified form of coordinate deriving apparatus for radio transmission.

The modified mechanism for producing said transmission of distance coordinates is shown in Fig. 6, wherein only the features of the apparatus which differ from those shown in Fig. 1 are illustrated. In this modified system a basic frequency, representing the minimum absolute value or arbitrary base N-S line from which the E-W coordinate is laid off on the receiving map, is generated by a constant speed motor 110, which through suitable coupling drives the armature 120 of an inductor similar to that shown in Fig. 1. Means are provided for adding to the basic coordinate frequency of motor drive 110 a frequency-generating speed corresponding to the distance of the E-W coordinate of the vehicle from that base. As shown, the E-W shaft 60 (driven from cylinder 39 as previously described, Fig. 1) is connected to pinion shaft 111 for transmitting motion to rack 112, to the end of which is attached ball carriage 113 of a ball and disc drive. The disc 114 thereof is directly driven by constant speed motor 110, while the driven cylinder 115 rotates at a speed equal to or greater than that of the motor shaft, depending upon the radial distances of the ball carriage 113 from the center of disc 114. The shaft of cylinder 115 is geared directly to the shaft 116 of the inductor motor armature 120. Hence the base or zero E-W coordinate will be produced as a frequency directly proportionate to the base speed of motor 110 when the ball carriage 113 is at the zero position of disc 114. When any motion is imparted to shaft 60, the ball carriage will be moved away from the center of the disc and thereby the inductor motor driven at a higher speed to generate a higher frequency. Thus the frequency generated by said motor will correspond directly or in absolute relationship to the E-W coordinate distance of the vehicle from the base or zero line on the map. It will be understood that the frequency generated by the inductor motor will be transmitted by a radio transmitter 100 with suitable carrier wave, as previously described. It will further be understood that the N-S coordinate, with a suitable base frequency, will be generated and fed to the transmitter 100 in like manner by similar apparatus, not shown.

Figure 7:
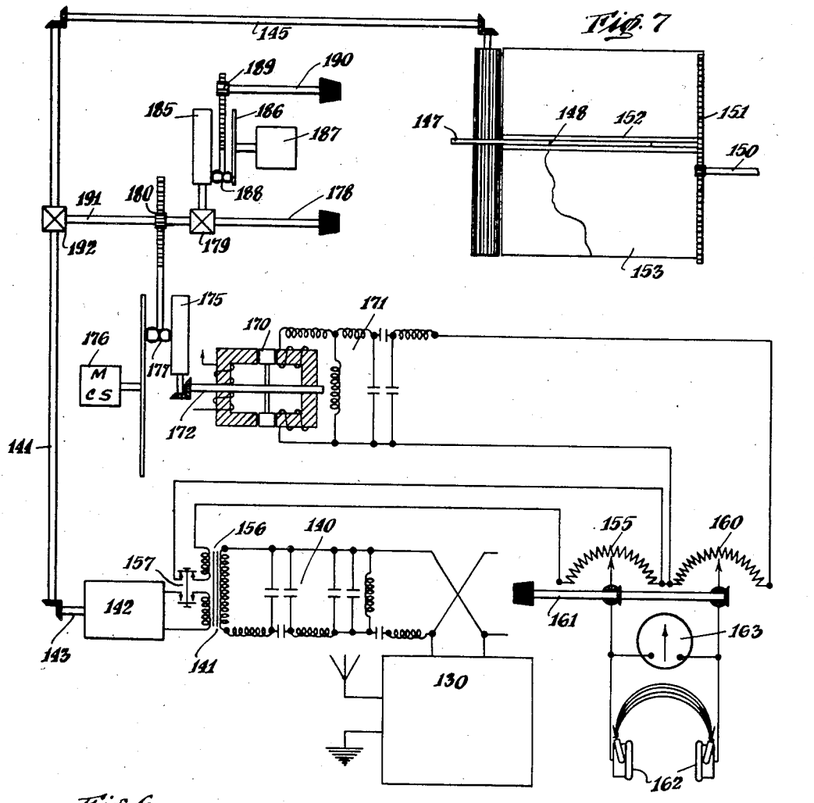
Fig. 7 is a schematic diagram of a preferred form of receiving apparatus for radio-transmitted coordinates and plotting mechanism associated therewith.

Referring now to those features of the invention relating to the reception and recording of the radio-transmitted coordinates of the vehicle, same are generally shown in Fig. 7. A radio receiver 130 (which may be of a standard U. S. Army Signal Corps type, series 193) is provided for picking up the audio frequency generated and broadcast by either the apparatus as shown in Fig. 1 or as modified, Fig. 6.

In Fig. 7 there is shown apparatus for receiving and recording frequencies transmitted as previously described. Said apparatus of Fig. 7 is adapted to utilize directly the audio frequency energy from the receiver for that purpose or, as an alternative, to receive said frequencies and transmit them to the recording apparatus by the interposition of manually operated means. Referring first to the direct transmission of audio frequency energy, the frequency of the E-W coordinate, for example, is separated from the carrier wave by circuit 140 and, through transformer 141, is fed into a servo-motor device 142. The latter, which may be of any known form for converting and amplifying the energy of a received audio frequency, such as hereinafter described (Figs. 14 and 15), is adapted to convert said E-W coordinate frequency into mechanical motion at the shaft 143, said motion being directly proportionate to that of the coordinate frequency received. The motion of shaft 143 is transmitted via shafts 144 and 145 to spur gear 146 of a recording apparatus constructed and operating essentially the same as that shown in Fig. 2. As shown, the spur gear operates a rack 147 which transmits East-West motion to a stylus 148 as will be clear from the preceding disclosures.

Similarly the N-S audio frequency coordinate will be received by receiver 130, converted to mechanical motion by a servo-apparatus and said motion transmitted to pinion shaft 150 which, through rack 151, imparts north-south motion to the stylus carriage 152. Thus the stylus 148 will trace on its map board 153 the same course as that drawn by the stylus 71 on map board 70, which course will be that followed by the vehicle with respect to the two identical maps, which are equally arranged with relation to their respective plotting mechanisms.

In some cases it may be desirable for mechanical simplicity or other reasons to avoid the use of a servo-mechanism in the receiving apparatus. Accordingly, the invention provides an alternative method of converting the received E-W and N-S audio frequencies into the required mechanical motion by the interposition of manual receiving and operating means. Referring to Fig. 7 a "fader" device, comprising resistance 155, is designed to receive the transmitted audio frequency of the E-W coordinate after same has been cleared of the carrier wave by circuit 140 (inductance 156 being provided for this purpose). A switch 157 is arranged to cut out the servo-motor circuit and cut in the fader circuit when the former is not to be used.

Resistance 160 of the fader is arranged to carry a frequency matching that of the frequency received in resistance 155. The frequencies on resistances 155 and 160 of the fader are balanced for signal volume by operation of the knob of shaft 161 in known manner, these frequencies being heard as two tones in the earphones of head set 162. When the frequencies on resistance 160 matches that on 155, the matching will be indicated very accurately as the two tones then become a beat. To assist the operator in indicating sudden changes of direction on the part of the vehicle, a copper-oxide galvanometer 163 may be placed in parallel with the head set, the throw of the needle thereof indicating the direction of change.

Means are provided for generating very accurately the matching frequency on resistance 160 and simultaneously for providing energy proportional thereto which may be used to operate the stylus-moving mechanism of the mapping recorder. For this purpose an inductor motor 170 is connected to fader resistance 160 through a refining circuit 171, the armature shaft 172 of the motor being driven at the speed required to provide the matching frequencies. The drive of said motor shaft is mechanically similar to that shown in Fig. 6, comprising driven cylinder 175 of the ball and disc drive mechanism which derives its basic speed from constant speed motor 176. The ball carriage 177 of said drive is positionally controlled by the manual operation of shaft 178 which, through differential 179, operates the rack and pinion 180 to vary the position of the ball carriage. Means for providing an accurately controlled rate of change in the movement of the ball carriage, and thereby in the changes of frequency set up in resistance 160, comprise means for applying motion through differential 179 by the variable speed ball and disc drive linking cylinder 185, disc 186 and constant speed motor 187. The position of the ball carriage 188 is regulated by the rack and pinion 189 controlled by manually operated shaft 190. It will be understood that the operator listening through head set 162 will turn shafts 178 and 190 until the frequency on resistance 160 matches that on 155.

As previously stated means are provided for transmitting mechanical motion corresponding to the frequency on resistance 160 to the driving mechanism of the mapping board. As shown, said means comprise the interconnection of shaft 191 (an extension of the pinion shaft operating rack 180) with the drive shaft 145 of the mapping board by means of differential 192. Thereby a mechanical motion corresponding to the matching frequency is directly generated and transmitted to the spur gear 146 of the mapping mechanism.

Similarly it will be understood that mechanically identical means will be provided for matching and transmitting the mechanical equivalent of the matched frequency of the N-S coordinate to the shaft 150 of the mapping mechanism.

Figures 8, 9, 10:
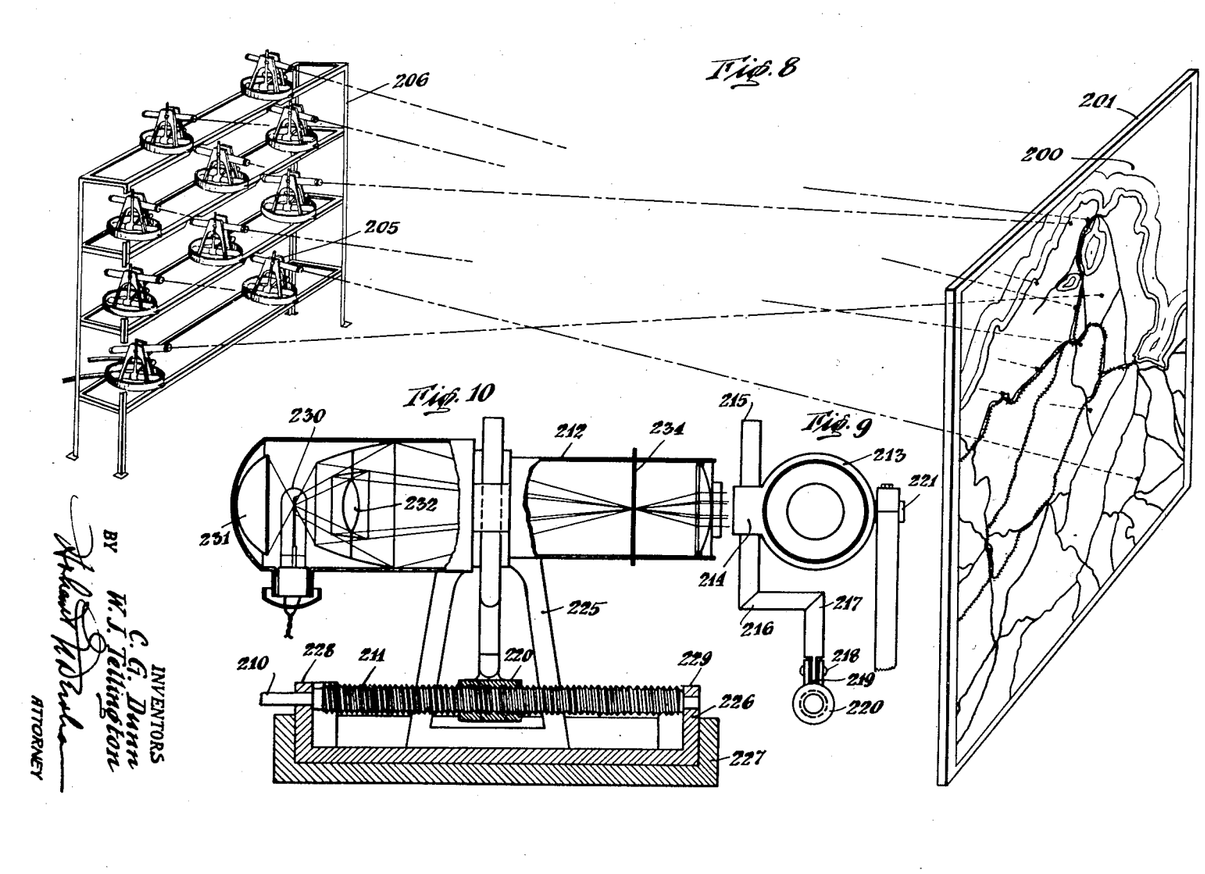
Fig. 8 is a perspective view of a situation map and a plurality of coordinate projectors arranged to cooperate therewith.
Fig. 9 is a fragmentary front end elevation of a coordinate projector.
Fig. 10 is a vertical section on line 10—10 of Fig. 9.

Further, in accordance with the invention, means are provided for projecting onto a large situation map or the like the position of the moving vehicle as indicated by a beam of light, which beam is positioned and controlled in accordance with the received and resolved coordinates of the vehicle travel. Referring to Figs. 8, 9 and 10, the lines of a large situation map 200 are printed or otherwise depicted on a translucent screen supported by frame 201. A plurality of light projectors 205, each corresponding to one of the vehicles to be shown on the map, are mounted in suitable relation with each other on a supporting rack 206 so that each of said projectors can independently throw its beam of light on to the back of the translucent map screen. By means described below the beam from each projector is caused to move over the map in conformity with the movement of the transmitting vehicle. Preferably each vehicle will be identified by providing in the projector beam a mask outlining a suitable identifying silhouette or symbol corresponding to that individual vehicle. Hence persons observing the map on a screen will see depicted thereon not only the terrain on which the vehicles are located, but will see at all times the actual present position and movement of each of said vehicles. The previous course of each vehicle may be quickly obtained by referring to the individual recording mapping boards thereof, previously described.

In Figs. 9 and 10 is shown the detailed mechanical construction of one of the projectors 205. Said projector is preferably of the "Stelmar" type adapted for rotation about horizontal and vertical axes much in the manner of the telescope of a transit. In order to project on to the flat map screen 200 a motion equal to the corresponding N-S coordinate movement of the vehicle, it is necessary to rotate the projector through an angle whose tangent is the N-S coordinate. Accordingly, means are provided for so moving the projector angularly in the vertical plane. For this purpose a flexible shaft 210 is rotatively driven with the same angular movement as that of the N-S coordinate shaft 150, previously described in connection with Fig. 7. Said shaft 210 is connected to drive a worm gear 211 which lies beneath and parallel to the axis of the projector barrel 212. Said barrel is supported in a collar bracket 213 having a vertically bored projection 214 through which the upwardly extending arm 215 is constrained to slide. At the opposite side of said collar 213 there projects a supporting trunnion 221 which is rotatively mounted near the upper end of triangular bracket 225, whereby the barrel 212 may rock in the vertical plane. The lower portion of said arm 215 is offset horizontally at 216 and again vertically at 217 to underlie the axis of the projector barrel 212. At its lower end arm 217 is pivotally connected by horizontal pin 218 to the upstanding yoke 219 of a threaded sleeve 220 adapted to engage and travel along the worm gear 211. Thus it will be evident that motion of the worm gear in either direction will cause the sleeve 220 to be translated and thereby to tilt the barrel of the projector through an angle whose tangent is that of the horizontal movement of the sleeve 220, i.e., the N-S coordinate. Consequently, the image projected on the screen by the projector will move through a projected distance equivalent to that of the N-S coordinate and, by proper position relationship between the projector and the screen the scale of such movement will be that of the particular map used.

In like manner horizontal rotational motion is imparted to the projector about its vertical axis. For this purpose the supporting bracket 225 of the projector barrel is based on a rotatable turntable 226 which is rotatively received within an outer stationary cylindrical receptacle 227. The turntable 226 is bar-shaped and provided with upstanding bracket portions 228 and 229 for rotational bearing of the ends of the worm gear 211. Rotational motion is imparted to said turntable 226 by worm gear 240 (Fig. 13) driven by a flexible shaft 241 connected to the drive of shaft 145 of the E-W coordinate.

Figure 13:
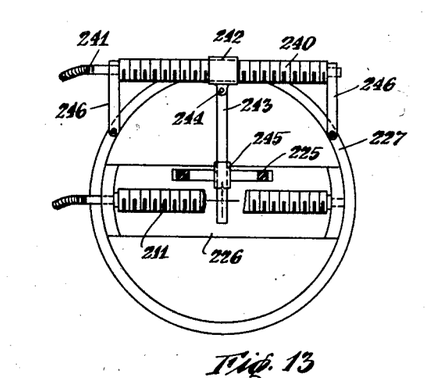
Fig. 13 is a partly diagrammatic plan view of the base of the projector shown in Fig. 10.

A threaded sleeve 242 is mounted about the worm gear 240 and arm 243 is pivotally connected to said sleeve by yoke and pivot pin construction 244. The axis of the worm gear 240 is parallel to that of worm gear 211 and is supported from the rim of receptacle 227 by parallel arms 246 which are journaled at their ends to rotatably support the worm gear. The arm 243 is constrained to slide through a sleeve 245 which is fixed to the turntable 226 so that when the sleeve 242 is at the center of the worm gear 240, the arm 243 extends normal to the axis of the worm gear and over the center point of the turntable, which point underlies the central longitudinal axis and the central vertical axis of the projector barrel. Hence the horizontal motion of the projector will be that of angles whose tangents are those of the imparted E-W coordinate.

The internal construction of the projector may be of any suitable design and as conventionally shown comprises a lamp 230 before a reflector 231 and having focusing lens 232. A mask 234 may be removably mounted in the gate of the projector for forming the light rays therefrom into any desired identifying image silhouette corresponding to the particular vehicle or other thing whose position and movement are being depicted on the map.

Thus it will be clear that the positions and movements of any reasonable number of vehicles may be projected onto or through a map carrying screen and thereby the major movements of all vehicular elements or groups of a command may be accurately and continuously presented to the observation of those seeing the map. Angular movements of the projector 205 will normally be sufficient to cover the movements of that vehicle within the limits of the map. However, to avoid too great a degree of angularity between the projector and the plane of the map, any projector may be moved to a better location on its supporting rack 206 whenever that becomes desirable and suitable orientation thereof with respect to the map can be established for further operation.

In accordance with the invention same also includes means for transmitting and visually presenting the oriented map-coordinated positions of any observed items of interest which may be seen from the transmitting vehicle. In general, the same basic mechanism hereinbefore shown and described will be utilized for this additional function of the invention. In carrying out this feature of the invention, reference may be had to Fig. 11 wherein is shown a map of African terrain, said map being oriented and set into the map board recording apparatus of Fig. 2. Operating in the manner previously described, the course of a vehicle which has traveled on the terrain depicted by the map beginning at the marginal point 250 (corresponding to the E-W base coordinate) is shown by the black lines upon the map to have traveled over the roads toward the town of Beja to a point 251. Thereupon let us assume that the operator of the vehicle notes an item of interest on the ground located at point 252 on the map, and desires to transmit information as to the location and identify of such item to his receiving headquarters. By means hereinafter described the operator may do so by manually moving the stylus of his recording board to point 252 on his map and thereby, through the transmitting mechanism hereinbefore described, in effect draw a straight line or ray over the map from point 251 to point 252 and there mark suitable indicia with the stylus. This free movement of the stylus across the map will result in the transmission of rapidly changing coordinates to the receiving set and thereby effect the drawing on the receiving set of the line or ray as stated. Having so indicated the coordinate position of the item at point 252, the operator restores the stylus to the present location of his vehicle on the map and operation continues in the normal way. Similarly the location of item 252 may be indicated by the operator when his vehicle has reached another point such as 253, thereby establishing intersecting rays on the recording maps and so locating the point or item with greater accuracy. Obviously the same item may be similarly reported by other vehicles in the vicinity having similar transmitting apparatus so that on the situation map 200 a plurality of rays or intersecting beams may point out graphically the existence and location of the item observed. The identity of such item may be portrayed diagrammatically by actually drawing a shape or symbol at the point indicated by means of the stylus or same may be done by transmission of a verbal description over an available channel in the radio transmitter.

Referring now to the embodied means for effecting the above described operations, it will be seen that manually operable clutches 61 are provided for the shafts 60 and 65 of the basic coordinate mechanism, such clutches being operable either with the constructions shown in Fig. 1 or that of Fig. 6, as will be apparent. When it is desired to perform the operation depicted in Fig. 11, the operator at the vehicle mapping board will declutch both coordinate shafts by means of the two clutches 61 and thereupon move the stylus 71 over the mapping board from the point 251 to the point 252 as previously described. This manual movement of the stylus will automatically rotate the shafts 60 and 65 and thereby transmit the coordinate frequencies evolved by such movement of the stylus through the transmitter 100 to the receiving stations. Consequently the movement of the stylus and coordinates of each point to which it moves will be automatically transmitted by the same mechanism hereinbefore described. The stylus is then manually returned to the point or origin (if the vehicle has stopped moving in the meantime) or to the present point of the vehicle on the map if same has continued to move during the manual operation of the stylus.

In the latter event, means are provided for facilitating return of the stylus to the present position of the vehicle with relation to the map. Such means comprise registering dials shown in Fig. 1 and in greater detail in Fig. 12, those for the E–W coordinates only being shown. As will appear from Fig. 12 a counter 260 is driven by shaft 261 which is coupled to the shaft being driven by E–W component cylinder 39. This counter may appropriately represent the number of tens of thousands of meters on a map of the scale shown in Fig. 11. A ring dial 262 is provided for recording the numbers of thousands of meters beyond the ten thousand presently indicated by counter 260, while ring dial 263 registers the number of hundreds of meters, all three of these counting registers being driven from the shaft 261. Thus the E–W position of the moving vehicle is always indicated by the dials 262 and 263 regardless of the position of the clutch 61. For example, the E–W coordinate of the vehicle at point 253 is 1788.80 as shown by the dials and as will be apparent from the map, and said dials will continue to record and indicate the changing position of the vehicle even while clutch 61 is disengaged and the stylus on the map record is not moving to trace the course of the vehicle.

Figures 11, 12:
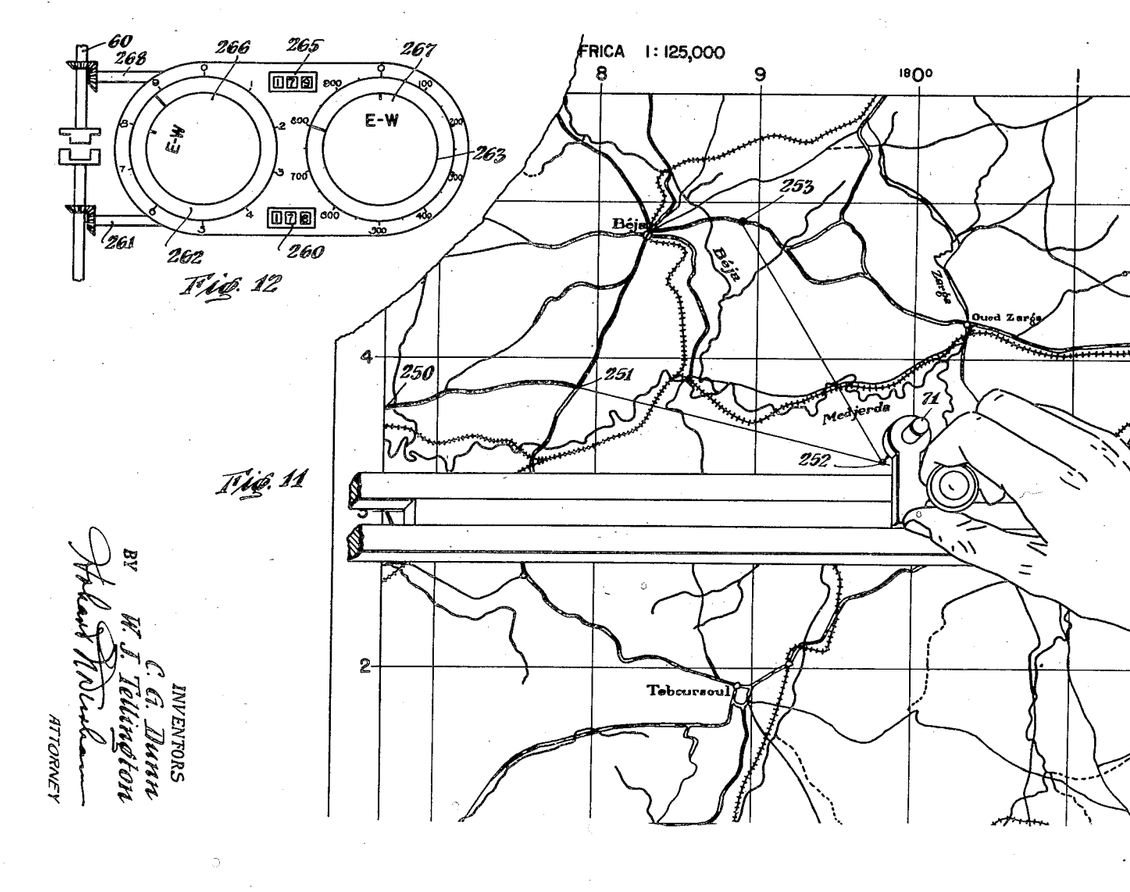
Fig. 11 is an enlarged fragmentary view in perspective of the plotting board shown in Fig. 2, illustrating the transmission of observed items.
Fig. 12 is an enlarged fragmentary detail, in elevation, of the coordinate indicating details shown in Fig. 1.

A ten thousand registering counter 265, thousands dial 266 and hundreds dial 267 are similarly connected to be driven by shaft 268 which is geared to shaft 60. Accordingly, motion transmitted to shaft 60 by the declutched or manual movement of the stylus, will be indicated and recorded on said register 265–267. During normal operation when the stylus is coupled to the vehicle-driven shaft, the clutches 61 are engaged and the inner and outer dials are matched. After the stylus has been used to plot a point other than the position of the vehicle, it must be returned to the present position of the vehicle on the map. This is done by approximately matching the dials and reengaging the clutches. Each clutch is preferably toothed in such a manner that approximate matching of the dials, followed by engagement of the clutch, results in exact matching of the dials. Thus the operator may disengage the stylus and indicate positions of other observed items at will but by means of the dials described above can always return the stylus to the exact present position of the vehicle on the map and automatic recording will continue as before. The same arrangement will, of course, be applied to the actuation of the similar device for the N–S coordinates, it not being necessary specifically to describe same. It will further be observed that the motions of the stylus will be recorded on the receiving map recorders just as they take place at the transmitting apparatus.

Figure 14:
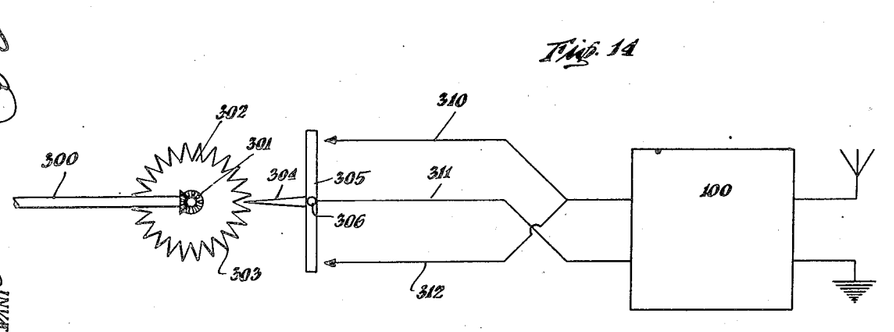
Fig. 14 is a fragmentary diagrammatic detail of a modified means for transmitting one of the coordinates of vehicle motion by radio transmission.
Figure 15:
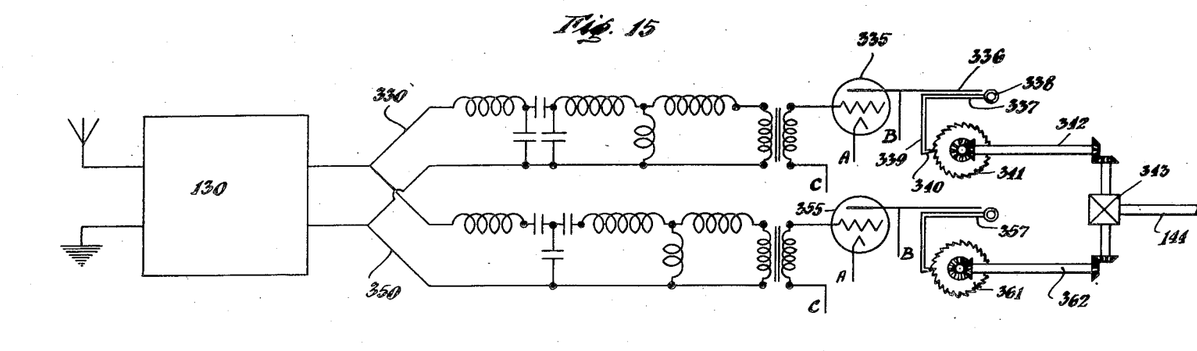
Fig. 15 is a similar view of apparatus for receiving and converting to mechanical motion the energy transmitted by the apparatus of Fig. 14.

In Fig. 14 is shown an embodiment of mechanism for transmitting a form of wave energy which can be readily converted into mechanical energy at the receiving station and, in Fig. 15, means for so converting same. The mechanism in Fig. 14 is in part a modification of the transmitting means shown in Fig. 1, and that in Fig. 15 in part a modification of the receiving apparatus shown in Fig. 7.

Referring first to Fig. 14, the shaft 300 is driven, like the shaft 60 of Fig. 1, corresponding to the E–W motion of the vehicle and for the purpose of this disclosure the motion of shaft 300 may be considered the same as that of the shaft 60. The motion of shaft 300, in accordance with this feature of the invention, is converted into electrical impulses, the number of said impulses varying directly with the R. P. M. of the shaft. For this purpose shaft 300 is geared directly to drive shaft 301 of a sprocket or toothed wheel 302, the teeth 303 of which are positioned to engage the tapered end of a pivoted interponent 304, the opposite end of which is fixed to a cross bar 305. Said cross bar is mounted to rock on the pin 306. As will be clear from the drawings, rotation of wheel 302 in the clockwise direction will cause a tilting of the bar 305 in the opposite direction while reverse rotation of wheel 302 will tilt the bar in the clockwise direction, and there will be such tilting and return of the bar each time that the interponent 304 encounters one tooth of the wheel 302.

By this means the bar 305 is adapted to act as a switch for closing a circuit each time the wheel is rotated through the arc between two teeth. Thus the circuit comprising the wires 310 and 311 is closed each time that the wheel 302 rotates through the interval between two teeth in the counter-clockwise direction, while the circuit 311–312 is closed each time the wheel rotates through a similar interval in the opposite direction.

It will be clear that by this simple means electrical impulses will be imparted to the transmitter mechanism 100 at a rate corresponding to the rotation of the shaft 300 and in a sense corresponding to the direction of that rotation. Hence if the vehicle is travelling at say 30 M. P. H. in the direction W to E a corresponding number of impulses will be communicated through suitable connections, not shown, to the transmitter 100 and will thereby be broadcast in known manner. If the vehicle is travelling at a similar rate in the E to W direction, the transmitter will send out an equal number of impulses in the opposite sense. In this connection the transmitter will be equipped so as to provide a definite band of audio frequency for the impulses generated in circuit 310–311 and a quite separate band for the impulses of circuit 311–312 (thus maintaining separate the two senses of direction for the E-W component).

Referring now to Fig. 15, apparatus is shown for receiving the impulses transmitted from the vehicle-connected transmitter 100 and for converting same into equivalent mechanical motion for operating a component shaft such as 144 shown in Fig. 7. In other words, the apparatus shown in Fig. 15 is one form of means for converting the frequencies or impulses received by the radio receiver 130 into mechanical motion, which function has already been ascribed to the apparatus marked 142 in Fig. 7. Said apparatus 142 and the other means between same and receiver 130 may be considered as a diagrammatic showing of operative apparatus, one embodiment of which is shown in Fig. 15 and described below.

For the purpose of cooperating with the impulse transmitter 100 of Fig. 14, the receiver 130 is provided with two separate filtering circuits generally marked 330 and 350, these circuits being respectively designed to receive the impulses corresponding to the W-E transmitter circuit 310—311 and the E-W circuit 311—312. The impulses so received by the filtering circuit 330 are amplified by suitable means 335 and the current so produced is transmitted to the magnet plate 336. In the field of said magnet plate is positioned an armature 337, one end of which is pivotally supported on a shaft or pin 338. The armature 337 is formed as a right angle, and on the depending arm 339 thereof is fashioned a pawl or dog 340. Said pawl is adapted to engage a ratchet wheel 341, the shaft of which is suitably coupled to drive a shaft 342 which, through suitable differential gearing 343, transmits its motion to the coordinate shaft 144 in the apparatus of Fig. 7. Similarly the impulses of the opposite sense of the same coordinate are passed through the filter 350, amplifier 355 and like motion-creating and transmitting means 357, 361 and shaft 362 to the other side of the differential 343, whereby motion in the opposite sense may similarly be imparted to the coordinate shaft 144.

It will be understood that the apparatus shown in Figs. 14 and 15 is adapted for the transmission of say the E-W coordinate of vehicle motion in either directional sense and that similar apparatus (not shown) will suitably be coupled to the transmitter 100 and the receiver 130 respectively for the transmission and reception of both senses of motion of the vehicle in the N-S directions.

Many of the uses of the invention for military and like purposes will be obvious from the foregoing. Another use of particular value and interest is its applicability to aircraft warning service and anti-aircraft information service, with resultant elimination and simplification of much work now done therein. Utilizing essentially the mechanism shown in Fig. 11 with necessary related transmitting equipment, an aircraft warning observer will manually indicate the course of an observed plane on his map board with the stylus, thereby transmitting the observed position and course of said plane to the receiving station at the air control center. The observer also, by pressing one or two of several button switches (not shown), may transmit the number, type and altitude of the observed planes. Receiving equipment similar to that shown in Figs. 7 and 8 may be located at the air control center where the projector 205 may be used to indicate on the large control map the course of approaching planes. A supervising operator may switch out the lights on those projectors which are least likely to be giving accurate reports for a given location or direction of aircraft approach, thereby preventing confusion from too many projectors pointing out the same plane. This use of the invention is of great importance in eliminating confusion and labor in aircraft warning service, especially as the reports can come direct from observers to the central board without use of filter or similar time consuming operations.

The invention in its broader aspects is not limited to the specific mechanisms shown and described but departures may be made therefrom within the scope of the accompanying claims without departing from the principles of the invention and without sacrificing its chief advantages.

What we claim is:

1. A position recorder for vehicles including in combination a vehicle, means connected therewith for resolving the polar coordinates of vehicle travel into motion corresponding to the rectilinear coordinates of said travel, means for transmitting said rectilinear coordinates to a distant receiving station, means for disconnecting said coordinate resolving means from the vehicle travel motion, selectively operable manually actuated means for describing coordinates of positions apart from that of the vehicle and connections for transmitting said latter named coordinates through said transmitting means to said distant station.

2. A position recorder for vehicles including in combination a vehicle, means connected therewith for resolving the polar coordinates of vehicle travel into motion corresponding to the rectilinear coordinates of said travel, means operated by said motion for converting same into quantities capable of radio transmission, means for transmitting said rectilinear coordinates to a distant receiving station, means for disconnecting said coordinate resolving means from the vehicle travel motion, selectively operable manually actuated means for describing coordinates of positions apart from that of the vehicle and connections for transmitting said latter named coordinates through said transmitting means to said distant station.

3. A position-indicating device including in combination a vehicle, means connected therewith for resolving the polar coordinates of vehicle travel into motion corresponding to the rectilinear coordinates of said travel, means for applying said rectilinear coordinates of motion to a stylus, said stylus being movable in oriented relation to a map, means for transmitting by radio the east-west and north-south rectilinear coordinates of motion of the stylus with respect to the map, and manual means for moving said stylus to selected positions on the map while said coordinates are being transmitted, a similar map and stylus at a receiving station and radio controlled means for moving said second stylus in conformity with the received coordinates of motion of the first stylus.

4. A device of the class described including in combination a vehicle having means for resolving motion of its travel into motions corresponding to its east-west and north-south component directions with respect to an oriented map, means for transmitting energy by radio corresponding to each of said components and means cooperating with the foregoing for similarly transmitting through said transmitting means the map-coordinate components of positions remote from the vehicle.

5. A device of the class described including in combination a vehicle having means for resolving motion of its travel into motions corresponding to its east-west and north-south component directions with respect to an oriented map, means for transmitting energy by raido corresponding to each of said components and means cooperating with the foregoing for similarly transmitting through said transmitting means the map-coordinate components of positions remote from the vehicle, and receiving means for automatically visually indicating on a receiving map positions and indicia corresponding to those transmitted.

CHARLES G. DUNN.
WENTWORTH J. TELLINGTON.